US009384575B2

(12) United States Patent
Armitage (10) Patent No.: US 9,384,575 B2
(45) Date of Patent: Jul. 5, 2016

(54) SPACE CONSTRAINED SMALL FORMAT VISUAL ANALYTIC LABELING

(71) Applicant: SAP AG, Walldorf (DE)

(72) Inventor: John Armitage, Berkeley, CA (US)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 13/891,012

(22) Filed: May 9, 2013

(65) Prior Publication Data
US 2014/0337808 A1  Nov. 13, 2014

(51) Int. Cl.
*G06T 11/60* (2006.01)

(52) U.S. Cl.
CPC ..................................... *G06T 11/60* (2013.01)

(58) Field of Classification Search
CPC ....... G06F 3/0481; G06F 3/048; G06F 11/60; G06T 13/40
USPC .......................................... 345/474; 715/864
See application file for complete search history.

(56) References Cited

U.S. PATENT DOCUMENTS

| | | | |
|---|---|---|---|
| 6,301,579 B1 | 10/2001 | Becker | |
| 6,519,603 B1 * | 2/2003 | Bays et al. | |
| 6,581,068 B1 * | 6/2003 | Bensoussan et al. | |
| 6,611,839 B1 * | 8/2003 | Nwabueze | |
| 6,995,768 B2 * | 2/2006 | Jou et al. | 345/440 |
| 7,606,835 B2 | 10/2009 | Laaser et al. | |
| 7,716,592 B2 | 5/2010 | Tien et al. | |
| 7,730,023 B2 | 6/2010 | MacGregor | |
| 8,589,402 B1 * | 11/2013 | Iampietro et al. | 707/741 |
| 8,725,775 B2 | 5/2014 | Gong et al. | |
| 8,732,696 B2 | 5/2014 | Bukary | |
| 8,743,122 B2 | 6/2014 | Riche et al. | |
| 2002/0070953 A1 | 6/2002 | Barg et al. | |
| 2007/0079247 A1 * | 4/2007 | Carignan et al. | 715/745 |
| 2007/0234198 A1 * | 10/2007 | Tien et al. | 715/512 |
| 2007/0239573 A1 * | 10/2007 | Tien et al. | 705/35 |
| 2008/0109740 A1 * | 5/2008 | Prinsen et al. | 715/764 |
| 2008/0180458 A1 | 7/2008 | Favart et al. | |
| 2009/0049372 A1 * | 2/2009 | Goldberg | 715/227 |
| 2010/0162135 A1 * | 6/2010 | Wanas et al. | G06Q 10/10 715/753 |
| 2011/0153548 A1 | 6/2011 | Varghese et al. | |
| 2013/0038612 A1 * | 2/2013 | Hanumara et al. | 345/440 |
| 2014/0059109 A1 | 2/2014 | Jugel | |
| 2014/0082540 A1 | 3/2014 | Armitage | |
| 2014/0157170 A1 | 6/2014 | Elias | |

* cited by examiner

*Primary Examiner* — Devona Faulk
*Assistant Examiner* — Hai Tao Sun
(74) *Attorney, Agent, or Firm* — Fountainhead Law Group PC (57) ABSTRACT

Systems and methods for automated rule-based labeling of space constrained small format visual analytics are disclosed. A label engine receives visual analytic data and metadata. Using default or specific rules, the label engine analyzes the metadata to determine a number of measures and dimensions of the visual analytic data. The label engine then analyzes the measures, dimensions, and other metadata according to the rules to generate a set of labels, and a set of locations within the visual analytic into which to insert the set of labels. Placement of the labels can be based on the size and format of the visual analytic. In addition, the placement of the labels can be based on a dashboard framework in which the visual analytic is disposed. Any labels that are redundant with the information in the context of the dashboard framework can be omitted from visual analytic.

17 Claims, 10 Drawing Sheets

| Meta Data Cat. | Measures | | Dimension Values | | | Measure Values | |
|---|---|---|---|---|---|---|---|
| | A: Main | B: Sub 1, 2 | C: Solo | D: Hierarchy | E: Time Hierarchy | F: Actual Value | G: % Value |
| 1. Main Title | As many as can fit in order: Main, Sub 1, Sub2 | | If Measure can be inherited from context, then first Dimension Value is Main Title | | | | |
| 2. Single Row Subtitle | | Show in Subtitle Row only if no Dimensional Values apply. Order: Sub 1, Sub 2 | As many as can fit, in reverser order of user selection. Hierarchy selections are grouped showing Terniual Value followed by its parents in parentheses | | | | |
| 3. Double Sub Title | | Show in row 2 only | As above, but only in row 3 if a Sub Measure occupies row 2. | | | | |
| 4. Triple Subtitle | | Show in row 2 & 3 | As above, but onlin row 3 & 4 if a Sub Measure occupies rows 2 & 3. | | | | |
| 5. Full Sub Title | | Show first in order w/ as many rows as necessary | Show after Measures, as above, w/ as many rows as necessary | | | | |
| 6. Time Slot | | | | | Show full time hierarchy, from small to large. Modify to suit division types. Month has 3-letter abrv. Dates resort to xx/xx/ - xx/xx. Xxx. Abbrev, Years [xx]. If only available Value is inherited from Context, show nothing. | | |
| 7. Number Slot | | | | | | Shows the alternate of % or Actual from the Chart, in digits. If Chart shows a comparisons of 2 values, show the ratio of the 2 Measure Value. For 3 compared values, show the sum/contribution of Dimensions Values. For Top n Lists, show sum. Limited to 3 digits. | |
| 8. Chart | | | | | | Shows as chart, as the alternate of % or Actual from the Number Slot | |

SPACE CONSTRAINED SMALL FORMAT VISUAL ANALYTIC LABELING

BACKGROUND

The present disclosure relates to analysis and display of information in small format visual analytics, and in particular, to automatically labeling space constrained small format visual analytics.

Unless otherwise indicated herein, the approaches described in this section are not prior art to the claims in this application and are not admitted to be prior art by inclusion in this section.

To display as much relevant information in often space constrained display devices, various types of small format visual analytics have been developed. As with other sizes of visual analytics, small format visual analytics may include any type of visualization of the underlying data or analysis. For example, the visualizations may include charts, graphs, metric values, etc., or some combination thereof. To increase the effectiveness of the visualization, some level of context can be provided for the visualization to be immediately meaningful. In general, context can be added to a visualization by labels included in the visual analytic. The labels can include the specification of a titles, units, scale, time, and the like. In relatively large format visual analytics, where space is not an issue, automatically adding labels to the various aspects of the visualization is a simple matter of parsing and including descriptive metadata from the analytic data and associating it with the visualization.

However, in smaller format visual analytics, all the information included in the metadata cannot always be included in a size that is intelligible while also maintaining the effectiveness of the data visualization. An individual small format visual analytic is typically constrained by particular size frame or boundary. Accordingly, if the size of the alphanumeric text used for the labels is too large, then it would be very difficult to include more than only a portion of the metadata before running out of room or occluding information represented in the visualization. On the other hand, if the size of the alphanumeric text used for the labels is made to be small enough to fit labels containing all of the metadata, then it may be too small to be legible or appear to be cluttered, thus distracting from the clarity of the associated visualization.

To avoid labels from becoming too large or growing too small, many information and analytic systems rely on users to manually determine and provide labels for any and all of the visual analytics the system produces. However, manually labeling visual analytics presents significant problems that prevent such systems from scaling to larger scale automatic generation of small format visual analytics.

As the ability of information and analysis systems to generate useful small format visual analytics automatically from the underlying analytic data and metadata increases, the potential for including too much or too little information in the labels also increases. The number of visual analytics that may be generated can quickly become unwieldy. Manually labeling each visual analytic in a clear and concise manner can become overly arduous, if not impossible. Additionally, leaving the labeling to up to individual users can cause inconsistencies in the manner in which visual analytics are labeled, thus reducing their overall effectiveness in communicating information to a larger audience. Since intelligent labeling of the visual analytics is often just as important as the visualizations themselves, an automated systems and method for labeling small format visual analytics present significant advantages.

Thus, there is a need for improved system and method for generating labeling. The present invention solves these and other problems by providing a system and method for rule based space constrained small format visual analytic labeling.

SUMMARY

Embodiments of the present disclosure improve automated labeling of space constrained visual analytics. One embodiment of the present disclosure includes a method that includes receiving a visual analytic framework comprising a plurality of space constrained regions, receiving analytic data and metadata, wherein the metadata comprises a plurality of descriptions of the analytic data. Such methods may also include receiving a plurality of labeling rules, analyzing the metadata and the plurality of space constrained regions according to the plurality of labeling rules to generate a set of labels, and generating a visual analytic based on the analytic data, the plurality of constrained regions, and the set of labels.

In one embodiment, generating the visual analytic comprises rendering a visualization based on the analytic data in a first space constrained region in the plurality of space constrained regions, and rendering a least a portion of the set of labels in a second space constrained region in the plurality of space constrained regions in accordance with the plurality of labeling rules.

In one embodiment, the plurality of space constrained regions comprises a first variable space constrained region and a second variable space constrained region, wherein if the first variable space constrained region increase in size, the second variable space constrained region decreases in size, and wherein generating the visual analytic is further based on a size of the first variable space constrained region.

In one embodiment, the first variable space constrained region comprises a number of label lines proportional to the size of the first variable space constrained region, and wherein generating the visual analytic is further based on the number of label lines.

In one embodiment, the method may also include receiving a dashboard framework comprising the visual analytic framework, wherein the dashboard framework comprises context data, and analyzing the metadata comprises comparing the plurality of descriptions of the analytic data to the context data.

In one embodiment, the context data comprises constraints on the analytic data.

In one embodiment, the plurality of descriptions of the analytic data comprises a description of a measure of the analytic data and a description of a dimension of the analytic data, wherein the measure describes a plurality of values of the analytic data and wherein the dimension describes a category of the plurality of values.

Another embodiment of the present disclosure includes a non-transitory computer readable medium comprising instructions that when executed by a computer processor cause the processor to be configured to: receive a visual analytic framework comprising a plurality of space constrained regions, receive analytic data and metadata, wherein the metadata comprises a plurality of descriptions of the analytic data. The instructions further cause the computer processor to be configured to receive a plurality of labeling rules, analyze the metadata and the plurality of space constrained regions according to the plurality of labeling rules to generate a set of labels, and generate a visual analytic based on the analytic data, the plurality of constrained regions, and the set of labels.

In one embodiment, the instructions that cause the processor to generate the visual analytic comprises instructions that further cause the processor to be further configured to: render a visualization based on the analytic data in a first space constrained region in the plurality of space constrained regions, and render a least a portion of the set of labels in a second space constrained region in the plurality of space constrained regions in accordance with the plurality of labeling rules.

In one embodiment, the plurality of space constrained regions comprises a first variable space constrained region and a second variable space constrained region, wherein if the first variable space constrained region increase in size, the second variable space constrained region decreases in size, and wherein to generate the visual analytic is further based on a size of the first variable space constrained region.

In one embodiment, the variable space constrained region comprises a number of label lines proportional to the size of the first variable space constrained region, and wherein to generate the visual analytic is further based on the number of label lines.

In one embodiment, the instructions that cause the processor to be configured to receive a dashboard framework comprising the visual analytic framework, wherein the dashboard framework comprises context data, and wherein the instructions that cause the processor to be configured to analyze the metadata further cause the processor to be configured to compare the plurality of descriptions of the analytic data to the context data.

In one embodiment, the context data comprises constraints on the analytic data.

In one embodiment, the plurality of descriptions of the analytic data comprises a description of a measure of the analytic data and a description of a dimension of the analytic data, wherein the measure describes a plurality of values of the analytic data and wherein the dimension describes a category of the plurality of values.

Yet another embodiment includes a system comprising: a processor, a memory coupled to the processor and comprising executable code that when executed by the processor cause the processor to be configured for: receiving a visual analytic framework comprising a plurality of space constrained regions, receiving analytic data and metadata, wherein the metadata comprises a plurality of descriptions of the analytic data, receiving a plurality of labeling rules, analyzing the metadata and the plurality of space constrained regions according to the plurality of labeling rules to generate a set of labels, and generating a visual analytic based on the analytic data, the plurality of constrained regions, and the set of labels.

In one embodiment, the visual analytic comprises rendering a visualization based on the analytic data in a first space constrained region in the plurality of space constrained regions, and rendering a least a portion of the set of labels in a second space constrained region in the plurality of space constrained regions in accordance with the plurality of labeling rules.

In one embodiment, the plurality of space constrained regions comprises a first variable space constrained region and a second variable space constrained region, wherein if the first variable space constrained region increase in size, the second variable space constrained region decreases in size, and wherein generating the visual analytic is further based on a size of the first variable space constrained region.

In one embodiment, the first variable space constrained region comprises a number of label lines proportional to the size of the first variable space constrained region, and wherein generating the visual analytic is further based on the number of label lines.

In one embodiment includes receiving a dashboard framework comprising the visual analytic framework, wherein the dashboard framework comprises context data, and wherein analyzing the metadata comprises comparing the plurality of descriptions of the analytic data to the context data.

In one embodiment, the context data comprises constraints on the analytic data.

The following detailed description and accompanying drawings provide a better understanding of the nature and advantages of the present invention.

DETAILED DESCRIPTION

Described herein are techniques for space constrained small format visual analytic labeling. In the following description, for purposes of explanation, numerous examples and specific details are set forth in order to provide a thorough understanding of the present disclosure. It will be evident, however, to one skilled in the art that the present invention as defined by the claims may include some or all of the features in these examples alone or in combination with other features described below, and may further include modifications and equivalents of the features and concepts described herein.

Overview

Embodiments of the present disclosure are directed towards systems and methods for rule-based labeling of visual analytics contained in a constrained display framework. Visual analytics are important and powerful tools used by decision-makers for viewing, understanding, and using complex information. For instance, business application data, such as manufacturing and sales statistics data, and business intelligence data, such as analyzed or filtered customer relations management (CRM) or enterprise resource planning (ERP) data, can be represented in visual forms as graphs, charts, trends, numerics, and so. To give context to the visualization of the underlying data, various labels may be added to specify the particular measures and dimensions of the visual analytic. As used herein, the term "measure" refers to the concept or metric being measured or analyzed. As such, a measure can refer to the manner in which data, such as business data, is categorized by numerical values or size. For instance, measures may include the dollar value of total sales, the number of users active on a particular websites, and the like. The term "dimension" can be used to refer to the categories or specific limitations applied during the analysis of the measures. Dimensions may include the manner in which the data is categorized by non-numeric set of descriptive types. For example, dimensions can include product descriptions, specific geographic regions, the boundaries on demographic groups, and so on. Cross referencing measures and dimensions allows for evaluation of data based on specific types and values.

The measures and dimensions of a particular visual analytic can be determined from the metadata that accompanies the visual analytic data. In such embodiments, a label engine can analyze the metadata in view of a set of labeling rules to extract or parse out descriptions from the metadata that can be used as labels in the visual analytic. Additionally, the label engine can also determine the size and location of the resulting labels based on characteristics of the metadata, the display framework, and the labeling rules. Specific examples of space constrained small format visual analytics will now be discussed to illustrate various aspects of the present disclosure.

Space Constrained Small Format Visual Analytics

Figure 1:
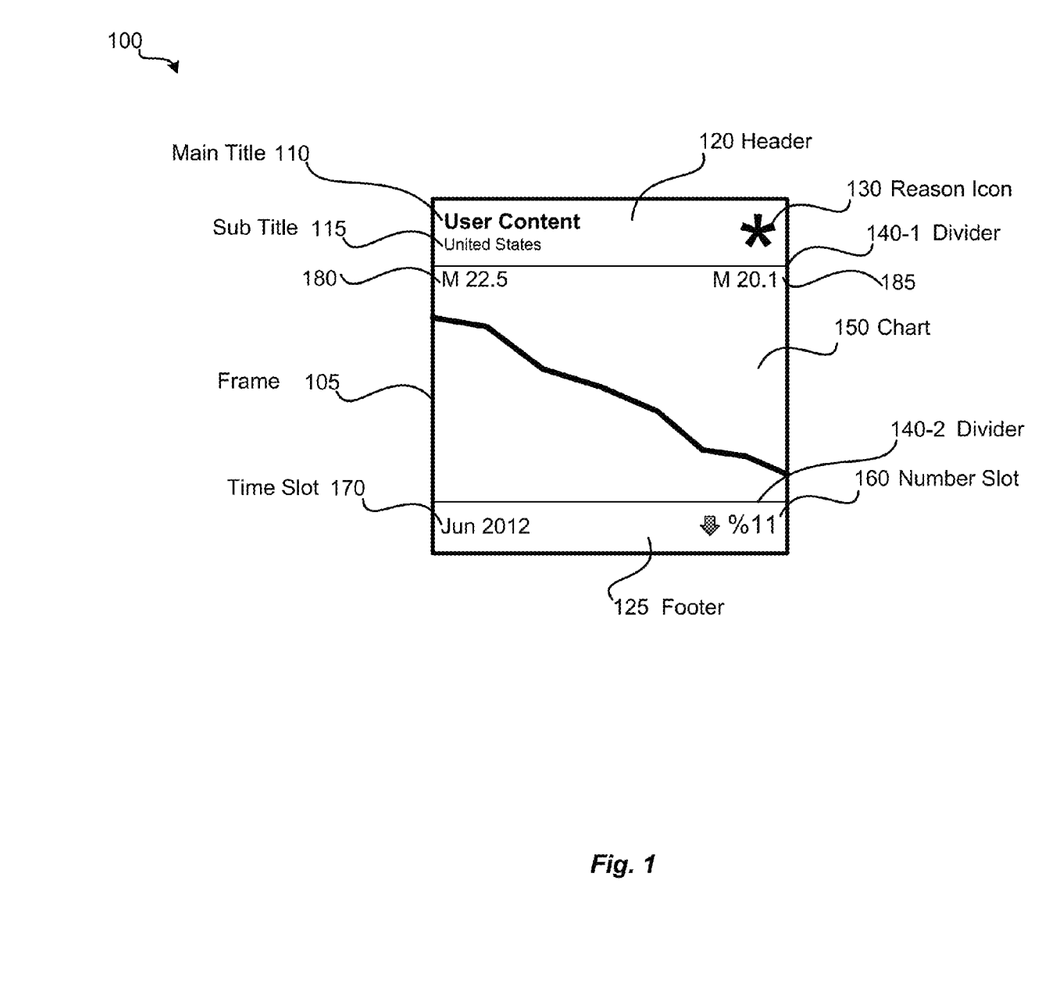
FIG. 1 illustrates a visual analytic with labeling according to embodiments of the present disclosure.

FIG. 1 illustrates an example small format visual analytic 100. While the particular example of the visual analytic 100 is shown with specific proportions, layout, and content, one of ordinary skill will recognize that embodiments of the present disclosure can be applied to visual analytics of any size, type, or format of visual analytic. As shown, some regions within the frame 105 can be dedicated to the display of a visualization, while other regions may be dedicated to the display of labels, legends, scales, and so on. For example, visual analytic 100, often referred to as a "point", can include a main title 110 and a subtitle 115 disposed in a header region 120. Visual analytic 100 can also include a timeslot 170 for displaying time related information and a number slot 160 for displaying pertinent values in a footer region 125 regarding the visualization depicted in chart region 150. The header region 120 and the footer region 125 can be separated from the chart region 150 by dividers, such as dividers 140 and 145. In some cases, the separation of the labels contained in the header 120 and the footer 125 from the visualization in chart region 150 can help improve level of clarity, and thus the usefulness, of the visual analytic. In some cases, however, labels can be superimposed on top of a particular visualization within the chart region 150 of the visual analytic 100. For instance, labels 180 and 185 that give high values and low values depicted in the visualization are illustrative of labels that may be included in the chart region 150.

Figure 2:
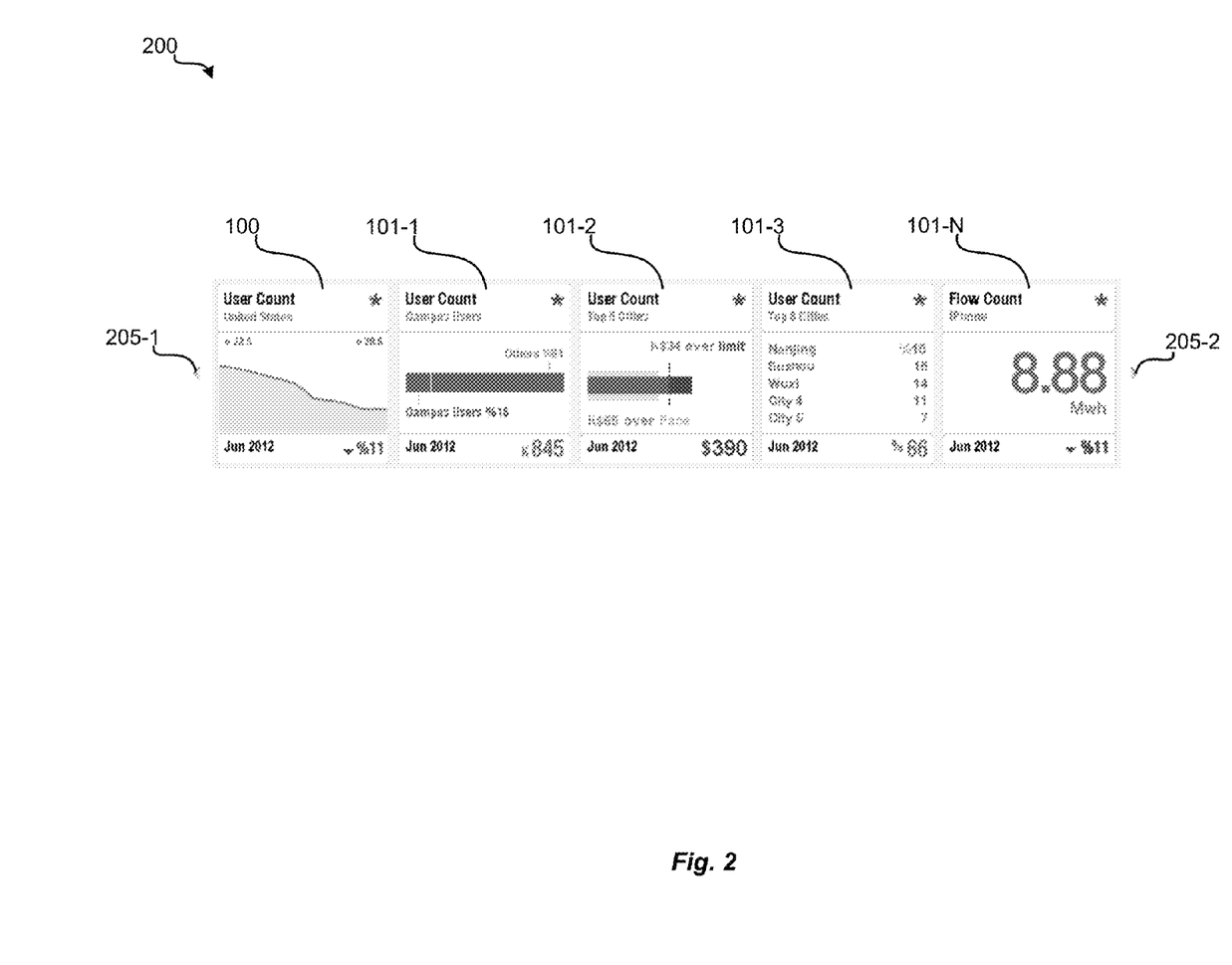
FIG. 2 illustrates a number of small format visual analytics with labeling shown within a dashboard framework according to embodiments of the present disclosure.

As used herein, the visual analytic 100 may include label and visualization data for one or more measures as defined by one or more dimensions. In some cases, the visual analytic 100 may be shown independently of other information or other visual analytics. However, in some embodiments a visual analytic 100 can be shown alongside other visual analytics to portray various aspects of the underlying data or to give a user information about many different types of data in a quickly viewable format. FIG. 2 shows one such scenario in which visual analytic 100 is shown alongside other visual analytics 101 as being part of a dashboard framework 200.

The dashboard framework 200 can include specifications for laying out the visual analytics 100 and 101, and may also include controls 205 for navigating among the visual analytics 100 and 101 within the dashboard framework 200. The dashboard framework 200 may also include context data regarding the information included in some of the visual analytics 100 and 101 contained in the dashboard framework 200. For instance, the dashboard framework 200 may include specifications for filtering, limiting, and categorizing the information displayed. As such, wherein one or more visual analytics or displayed within a particular dashboard framework 200, some of the labels determined from the visual analytic data metadata can be omitted or inferred based on the context data associated with the dashboard framework 200. For example, the dashboard framework 200 may include context data that specifies a particular time period, geographic region, demographic, measure, dimension, and so on. Such information can then be omitted from the visual analytics 100 and 101 because it would be redundant.

Figure 3:
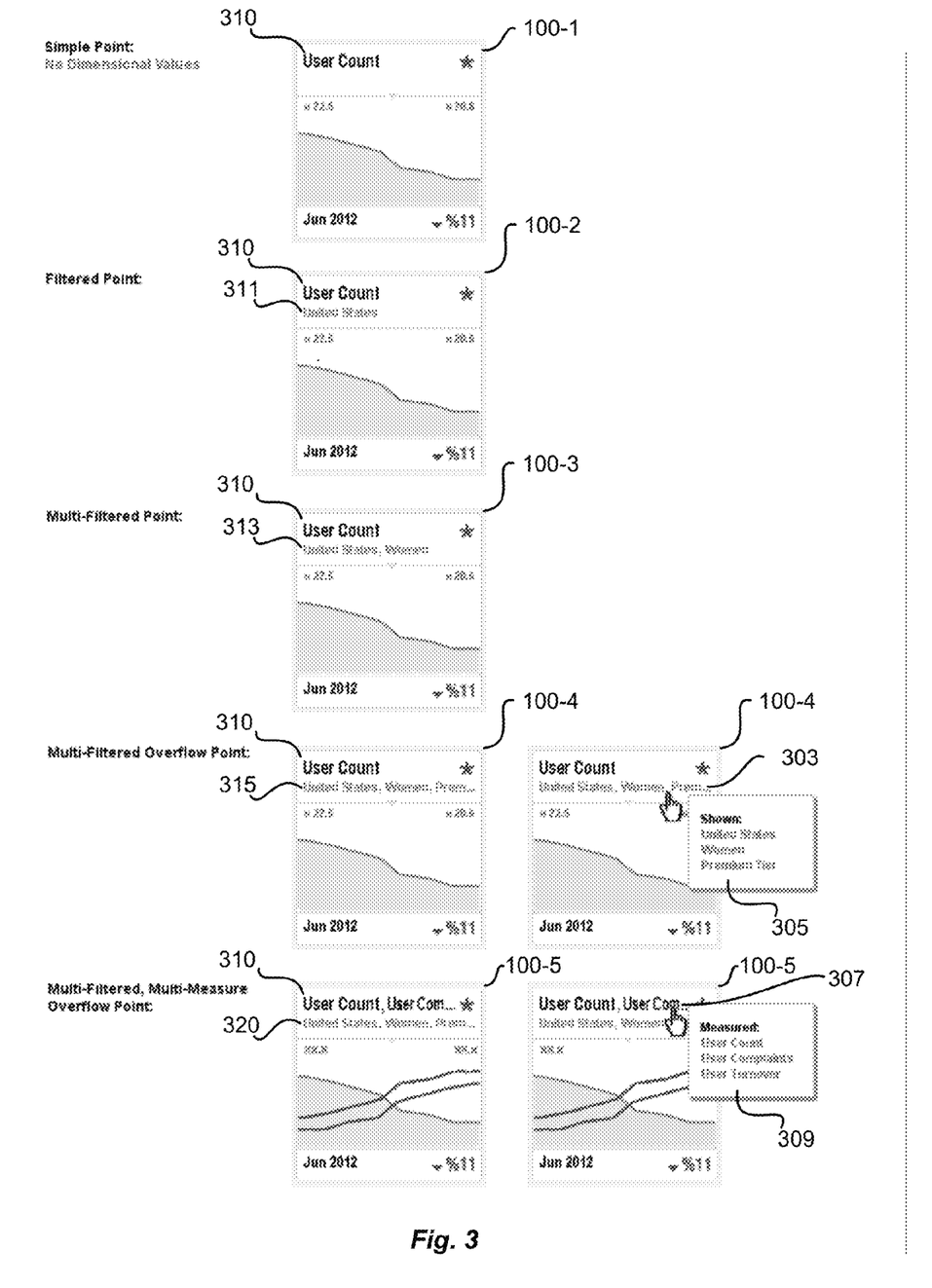
FIG. 3 illustrates various visual analytics with different levels of labeling according to embodiments of the present disclosure.

FIG. 3 illustrates variations of visual analytic 100-1 through 100-7. The most basic variations of visual analytic 100 is depicted as visual analytic 100-1 or a "simple point". In such variations, visual analytic 100-1 includes a title that includes the measure of the visual analytic in the title 310 and no dimensional values. Variation of visual analytic 100-1 may be useful in scenarios in which the dimensions of the visual analytic are determined by the dashboard framework in which it is disposed.

In embodiments in which the visual analytic is not included in a specifically filtered or categorized scheme associated with a particular dashboard framework, it is often desirable, and sometimes necessary, to include labels to specify the dimensions of the measures of the associated visualization to give context to the data and visualization. For example, variation of visual analytic 100-2, referred to as a "filtered point", shows a subtitle 311 that includes a label that indicates that the visual analytic 100-2 was filtered or limited to a specific dimension. In the specific example shown, visual analytic 100-2 was limited to the United States. The visual analytics can also be filtered by multiple dimensions. Variation of visual analytic 100-3, referred to as a "multi-filtered point", shows a subtitle 313 that includes a label that indicates that the visual analytic 100-3 was filtered or limited to two specific dimensions. For example, the subtitle 313 of visual analytic 100-3 indicates that the visualization and other data included as having been filtered or limited to users who are women in the United States.

In some scenarios, the amount of metadata required to give context to the visualization in a particular visual analytic can include more alphanumeric text than will fit in a header or footer region. This is particularly true in embodiments in which the font size and spacing are fixed. To accommodate labels that include more characters than can be accommodated in the space constraints of the visual analytic framework, various embodiments of the present disclosure include "multi-filtered overflow points" and "multi-filtered, multi-measure overflow points", as depicted in visual analytics variations 100-4 and 100-5. As shown, visual analytic 100-4 includes a subtitle 315 comprising alphanumeric text of the dimensions that when displayed in a particular font size and format overflows the space constraints of the header. To accommodate the scenario in which the available space in the header is insufficient to list all of the labels, embodiments of the present disclosure allow for controls 303 to be embedded or included in the labels that will display additional labels or a complete listing of the labels. For example, when a user hovers a cursor over or selects control 303, a label window 305 may appear to list any or all of the labels in subtitle 315. Similarly, visual analytic 100-5 may include multiple measures in the title 320 that result in labels that would overfill the constrained space of the visual analytic framework when listed in the prescribed format and size. To accommodate full labeling of the associated visual analytic 100-5, embodiments of the present disclosure may include controls 307 included or embedded in the title 320 for showing additional or complete labeling of the visual analytic. For example, when a user hovers a cursor over or selects control 307, a title or measure window 309 may appear to display any or all of the applicable measures associated with the particular visual analytic.

Figure 4:
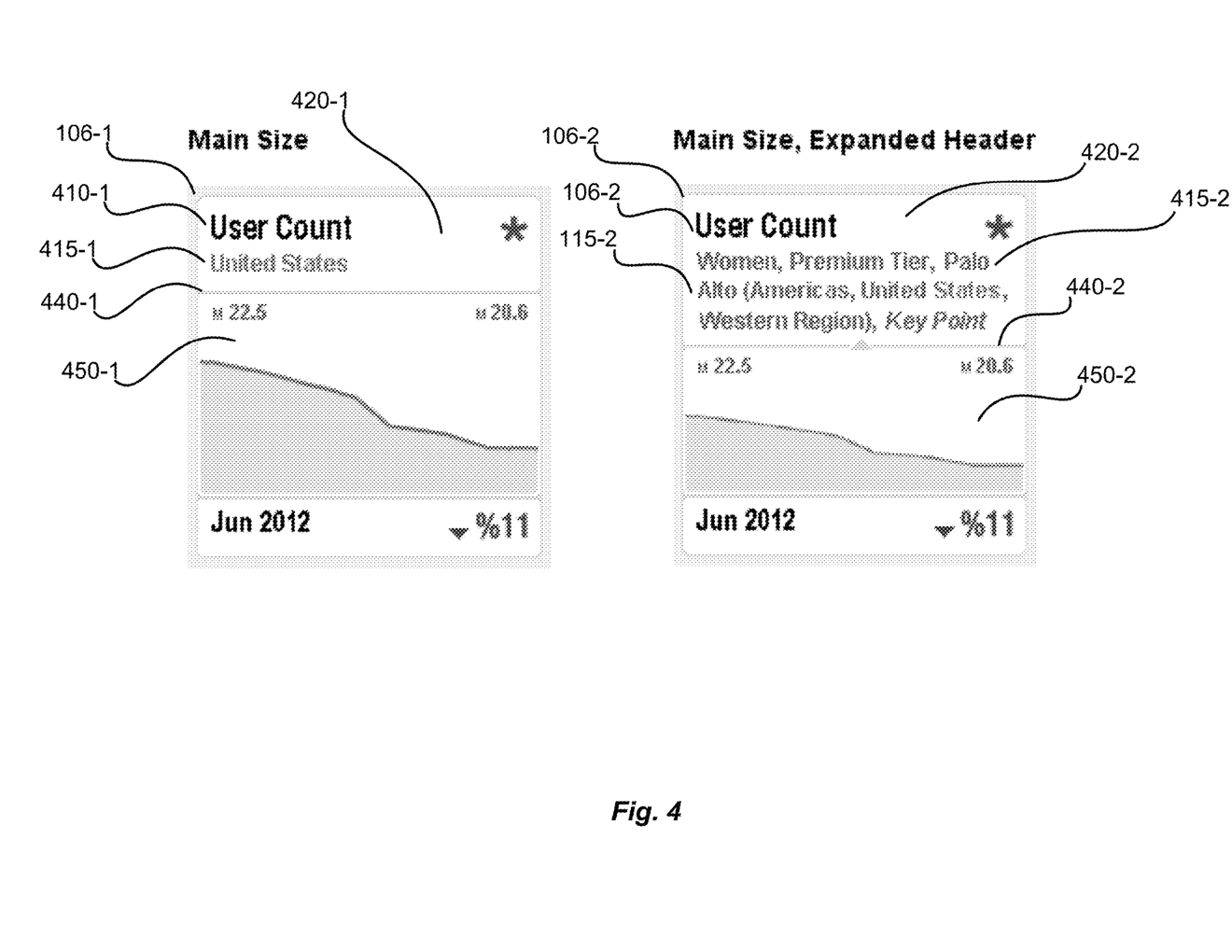
FIG. 4 illustrates variable constrained region of a small format visual analytic according to embodiments of the present disclosure.

In some embodiments, the visual analytics may include two views of the visual analytic in which one of the views includes less information or fewer labels that another view. FIG. 4 illustrates one example of visual analytic 106 with an expandable header, according to an embodiment of the present disclosure. A visual analytic with an expandable header is one example of a variable sized space constrained region of a visual analytic framework. As used herein, visual analytic framework of a particular visual analytic refers to a template or preset layout of specific information into which the visualization, labels, and associated data can be inserted for display. FIG. 4 illustrates just one example of a visual analytic with variable size space constraints. Visual of visual analytic 106-1 may include a main size view in which a title 410-1 and a subtitle 415-1 are displayed in the header 420-1. The header 420-1 is separated from the chart region 450-1 by divider 440-1. While visual analytic 106-1 may include additional dimensional value labels that could be displayed in the subtitle 415-1, those labels are hidden from view. To display additional or all labels associated with the visual analytic, divider 440 can be moved from position depicted as 440-1 to position 440-2 to increase the size of the constrained space, as depicted as header 420-2. With more space in header 420-2, additional labels may be displayed in the subtitle lines 415-2. The movement of the divider 440 is referred to as a "window shade control". Accordingly, the divider 440 may be moved to incrementally show more or fewer lines of subtitles 415. The visualization shown in the chart region 450 may have its proportions altered so that all or some of the visualization remains visible when the divider 440 is moved from one position to another.

As noted, the specific content included in the labels may be based on a number of visual analytic characteristics including, but not limited to, the context data associated with a particular dashboard framework, the metadata associated with the analytic data used to create visualization of a particular visual analytic, and the space available within the visual analytic framework. Based on the expected or encountered visual analytic characteristics, rules can be devised to automatically generate labels for a particular visual analytic that clearly and concisely convey usable information to a user about that visual analytic. The rule-based automatic generation of visual analytic labels increases scalability of various information and analytic systems that generate visual analytics by reducing the dependency on users to manually label or title the resulting visual analytics. In addition, by following a predetermined rule-based scheme, consistency of the generated visual analytic labels can also be increased, thus increasing the usefulness of the generated visual analytics across a greater audience of users. For example, when one user refers to a particular visual analytic with a particular set of labels, another user will be able to easily understand what is being referred to. The systems and methods for generating visual analytic labels according to a set of label rules are discussed in more detail below.

Label Engine

Figure 5:
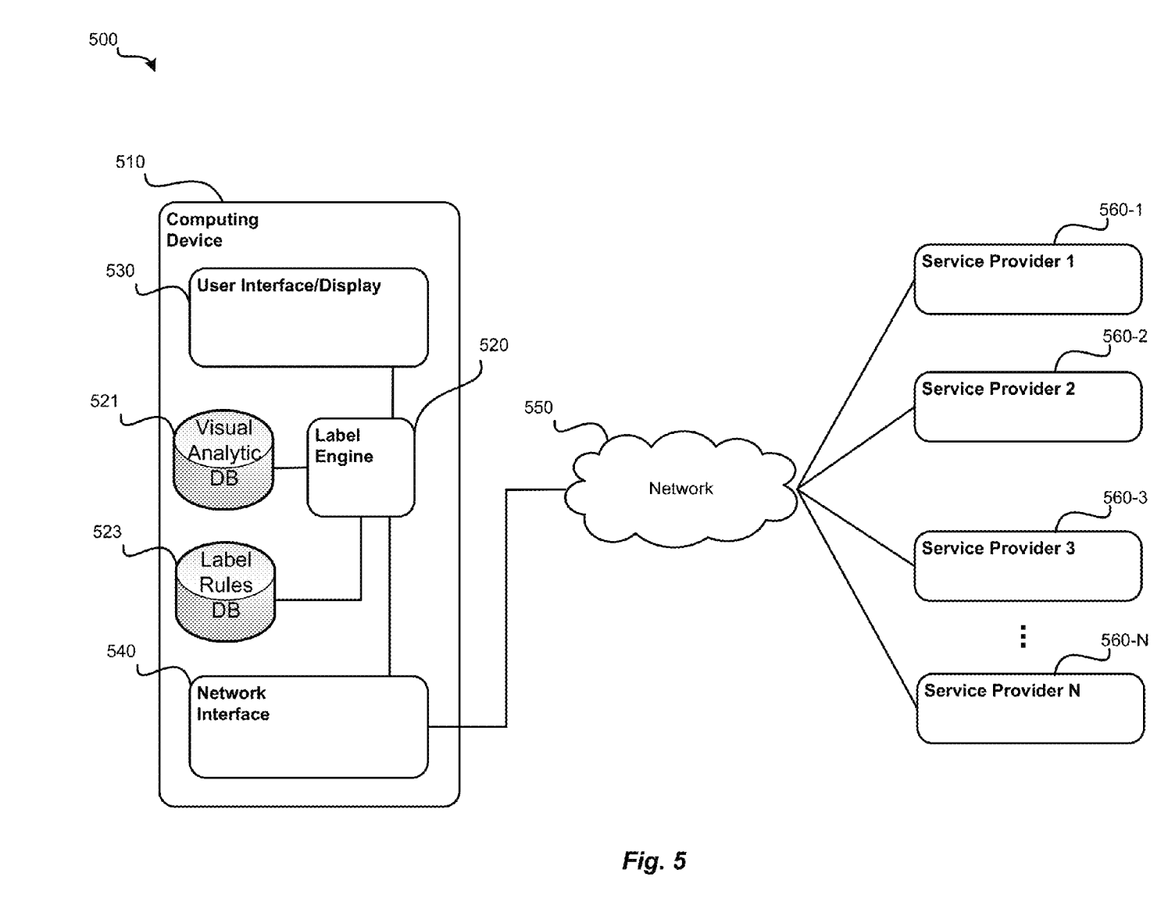
FIG. 5 is a block diagram of a system for automatically generating labels for small format visual analytics according to embodiments of the present disclosure.

FIG. 5 depicts a system 500 for generating visual analytic labels according to various embodiments of the present disclosure. As shown, system 500 may include a computing device 510 in communication with one or more service providers 560, such as business information and intelligence application, through network 550. Computing device 510 may include any type of computing system including, but not limited to, server computers, desktop computers, tablet computers, smart phones, and so on. Each one of the service providers 560 may include information stores or information analysis sources implemented as software executed on a computing system that is local to a remote from computing device 510. Accordingly, network 550 may include both local area networks (LAN) as well as wide area networks (WAN), such as the Internet. In such embodiments, the computing device 510 can receive analytic data or complete visual analytics from service providers 560 through network interface 540, as well as retrieve analytic data or complete visual analytics from the internal visual analytic database 521. To generate labels, the computing device 510 may include a label engine 520. The label engine 520 may be implemented as computer readable code executed on a processor of the computing device 510. While not shown, the computing device 510 may also include a visual analytic manager for generating the dashboard framework or specific visual analytic framework into which the labels generated by the label engine 520 may be inserted.

In some embodiments, the label engine 520 may determine a visual analytic framework. In some embodiments, the label engine 520 may receive or retrieve the visual analytic framework from the internal visual analytic database 521, or from any one or more of the service providers 560. In related embodiments, the visual analytic framework may be part of a larger dashboard framework. In such embodiments, determining the visual analytic framework may include determining the dashboard framework and parsing out one or more component visual analytic frameworks. The dashboard framework can include context data for filtering or categorizing the information depicted in the visual analytics contained in the dashboard framework. In addition, the dashboard framework may also include further space or operational constraints on the space and operational constraints of the visual analytic frameworks.

The label engine 520 may determine analytic data and associated metadata for a number of corresponding visual analytics. In some embodiments, the label engine 520 may receive or retrieve the analytic data and metadata from the internal visual analytic database 521 and/or from any of the service providers 560. To determine labels to insert into a visual analytic corresponding to the analytic data and an appropriate analytic data framework, the label engine 520 may receive or retrieve a set of labeling rules from the label rules database 523. In some embodiments, each set of labeling rules stored in the label rules database 523 may be associated with the particular type of visual analytic framework for template. In other embodiments, each set of labeling rules stored in label rules database 523 may be associated with a particular visual analytic or visualization type. In any such embodiments, the label engine 520 may determine which set of labeling rules to receive or retrieve based on the visual analytic data and/or the metadata.

Once the label engine 520 determines a set of labeling rules, the label engine 520 can analyze the analytic data and/or the metadata according to the rules to generate one or more labels to be included in a corresponding visual analytic. The generated labels can be based on the rules, the analytic framework, the dashboard framework, the metadata, the space constraints of the particular analytic framework, and so on. Such labels can include alphanumeric text derived from descriptions of the measures and dimensions of the analytic data included in the metadata. Determining the labels can also include determining the location and the layout of the labels dashboard framework for visual analytic framework. Accordingly, some labels may be included as a title of the visual analytic, while other labels may be included as a subtitle, scale, time elements, or numeric. The labels may be determined to be included in label only regions of the visual analytic, or included as a superimposed label in a region that includes a visualization of the analytic data.

Figure 6:
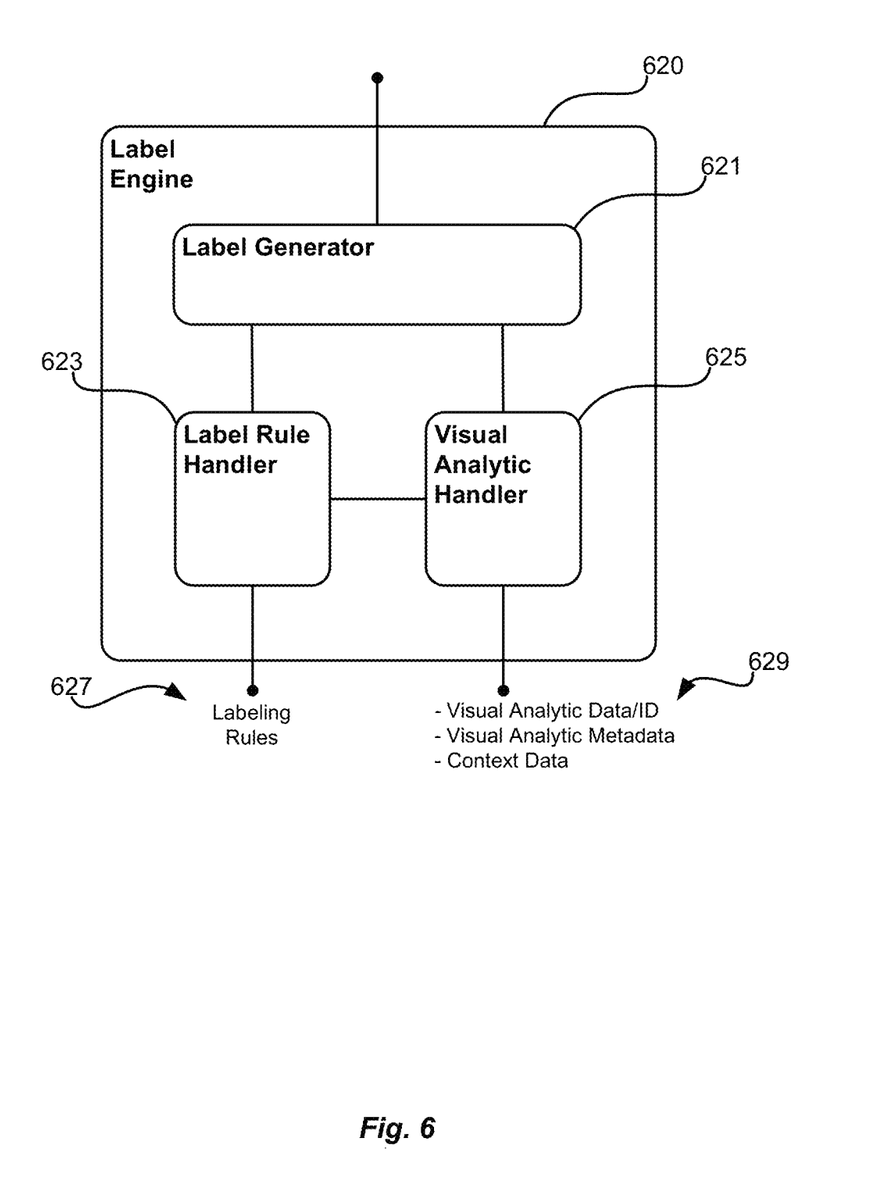
FIG. 6 is a block diagram of a label engine according to embodiments of the present disclosure.

FIG. 6 illustrates label engine 620, according to various embodiments of the present disclosure. Label engine 620 may include a label generator sub module 621. The label generator sub module 621 may be coupled to a label rule handler 623 and a visual analytic handler 625. Each of the subcomponents with in label engine 620 can be implemented as individual or integrated software elements executed by processor of computing device 510. In any such embodiments, the label rule handler can include functionality for retrieving or receiving labeling rules 627 from an internal or external visual analytic database. The label rule handler 623 may also include functionality for parsing or analyzing the labeling rules 627 into a format usable by the label generator 621. Parsing or analyzing the labeling rules 627 can include transforming the received labeling rule 627 from a native format into a format applicable or usable to the visual analytic data, metadata and or context data 629 received by the visual analytic handler 625. Accordingly, in some embodiments of the visual analytic handler 625 analyze the received data 629 to determine various characteristics. For example, the visual analytic handler 625 can determine the type of visual analytic to be generated, or the visual analytic framework and dashboard framework into which the visual analytic will be displayed. Based on the characteristics provided by the visual analytic handler 625, the label rule handler 623 can retrieve and/or transform a corresponding set of labeling rules 629.

The visual analytic handler 625 may also provide the data 629 and characteristics about the data 629 to label generator 621. Label generator 621 can then analyze the data 629 according to the original or transformed labeling rules 627 to generate a number of labels.

Figure 7:
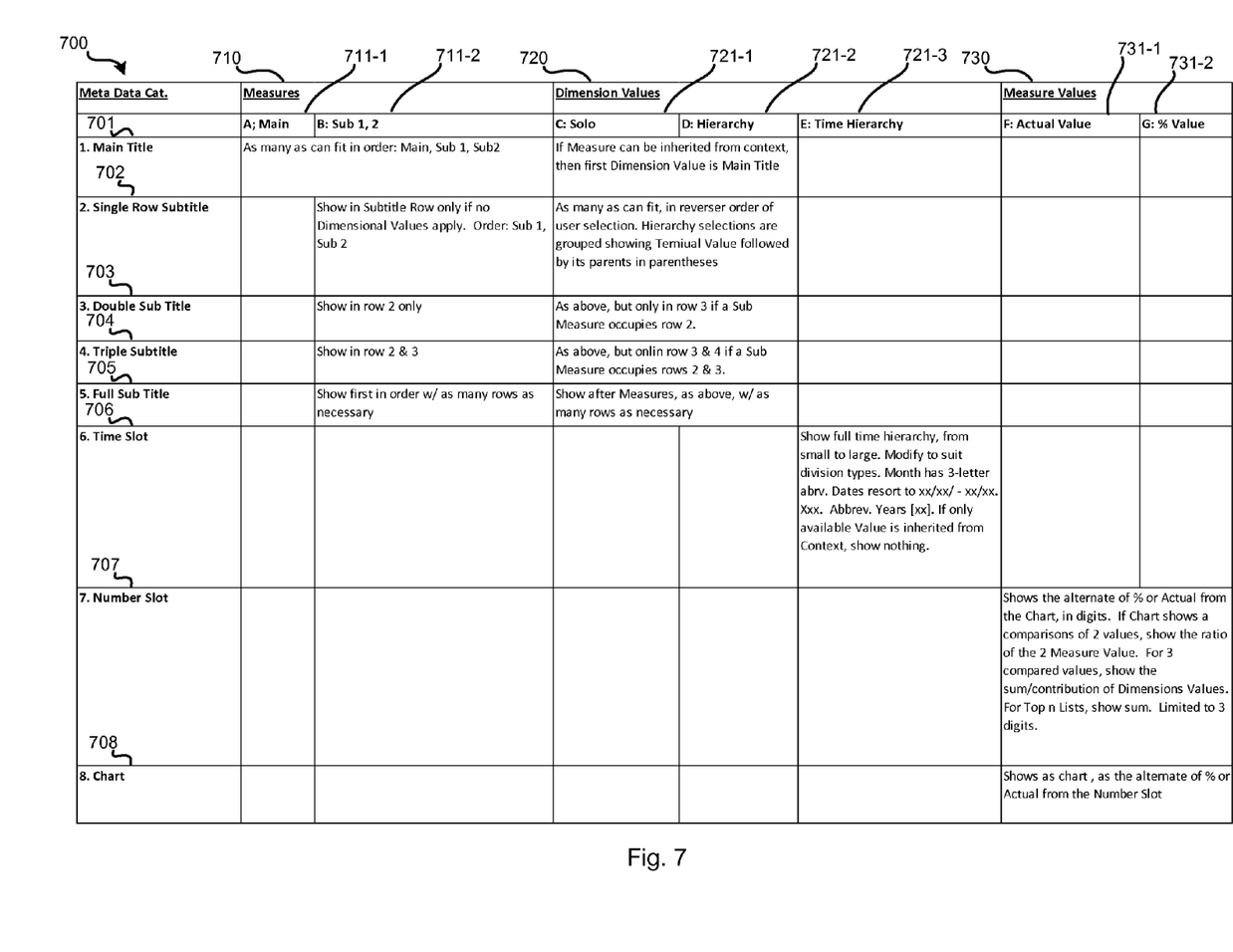
FIG. 7 is a chart of a set of labeling rules according to embodiments of the present disclosure.

FIG. 7 depicts a specific set of labeling rules according to an embodiment of the present disclosure. As shown, the labeling rules can be organized in an example chart 700. Other structures are possible for organizing and storing specific sets of labeling rules. As shown, chart 700 includes a number of specific label locations within a particular visual analytic. Specifically, chart 700 includes a row for the main title 701, a row for the single road subtitle 702, rows for double, triple, and full subtitles 703 through 705, as well as rows 706 through 708 four a timeslot, a number slot, and a chart. Chart 700 may also include a number of column headers with rules for handling the content of measures 710, dimensions 720, and measure values 730 determined from the metadata of a particular visual analytic. The structure of chart 700 implies a top-down and left to right processing of the rules, however, the rules contained in the chart 700 may be parsed, analyzed, and processed in any order conducive to generating labels.

In the particular example shown in FIG. 7, the rules include specific requirements for generating and inserting the labels into the various titles, subtitles, and slots. Specifically, the rules can include analysis of the measures 710 defined in the metadata for particular visual analytic. In some embodiments, the particular visual analytic can include one, two, or three measures. These measures can be prioritized and assigned as a main measure 711-1 and sub measures 711-2. If the visual analytic is to be displayed independent of a dashboard framework, then the determined main measure 711-1 and sub measures 711-2 can be displayed in order with as many alphanumeric characters as will fit in the space allotted for the title. The labeling rules also specify that sub measures 711-2 may be included in the subsequent subtitle lines if no dimensional values are available.

However, if the visual analytic is to be displayed within the context of a dashboard framework that specifies a specific categorization, filtering, or limitation on the data shown in the constituent visual analytics, then inclusion of the main measures 711-1 and/or sub measures 711-2 may be omitted from the visual analytic because they can be inferred or inherited from the context of the dashboard framework. In such scenarios, the dimension values 720 can be prioritized and used as the main title of the visual analytic. In addition, if space permits in the visual analytic framework of the visual analytic, then subsequent dimension values can be inserted into the subsequent rows of the subtitles. The order in which the dimension values 720 are listed in the rows of the subtitles can be based on user preference or filtering solo specifications 721-1 listed in reverse order. The order can also be determined by listing the dimension values in their hierarchy 721-2, beginning with lower-level and proceeding through to the top level. If space permits, main measures 711-1 or sub measures 711-2 can also be included in the remaining rows of subtitles.

Chart 700 also includes rules for inserting the timeslot 706. The specific example shown indicates that the full-time hierarchy 721-3 from small to large should be included in the timeslot. Specific modifications based on the visualization type, abbreviations and format for date can also be specified.

Chart 700 also includes rules 707 for inserting measure values 730 into the number slot. The specific example shown in FIG. 7 indicates that the timeslot should show the alternate vies of actual value 731-1 and percent values 731-2 from the chart in digits. If the chart shows a comparison of two values then the number slot should show the ratio of the two measured values. For three compared values, the number slot 700 should show the sum/contribution of the dimension values. For top n-lists, the number slot should show the sum of the list. The rules for the number slot 707 also indicate any other preference or requirement of the information displayed in the number slot 707.

Finally, chart 700 may also include rules for labeling the chart or visualization 708. In the specific example shown, the default is to illustrate the chart in the chart region of visual analytic as the alternate of the percentage or actual values 731-2 and 731-1 from the number slot. Accordingly, the information included in the chart region of visual analytic can be alternated between a numeric and the visualization of the data.

Figure 8:
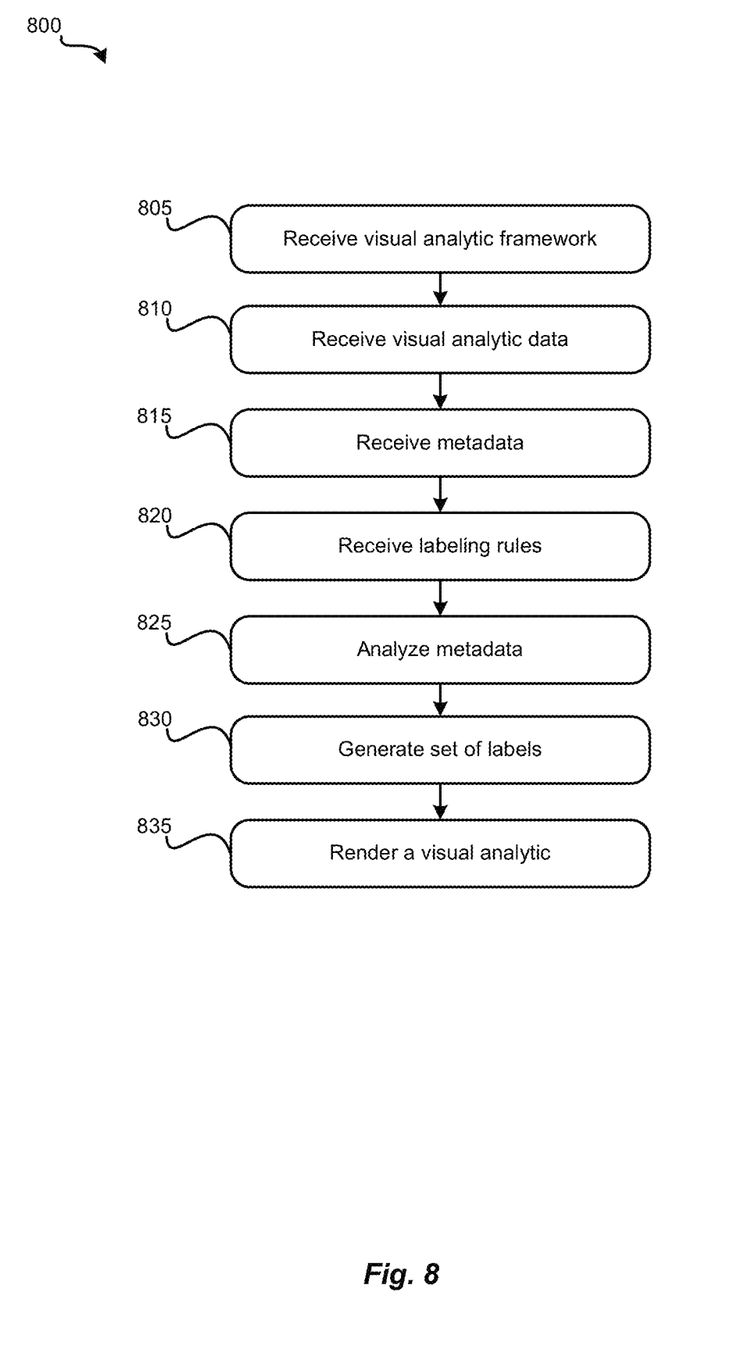
FIG. 8 is a flowchart of a method for automatically labeling small format visual analytics according to embodiments of the present disclosure.

FIG. 8 illustrates a method 800 or generating labels for visual analytics, according to various embodiments of the present disclosure. The method may begin at action 805, in which the label engine may receive a visual analytic framework. As discussed herein, the visual analytic framework may include specifications of the constraints of a particular visualization and specifics for generating the visualization. Such constraints can include limitations on the size and shape of the frame in which the visualization and accompanying labels may be placed.

In action 810, the label engine may receive the visual analytic data from the internal service provider or an external service provider. In some embodiments, the visual analytic data is in the format of a complete or rendered visual analytic. In other embodiments, the visual analytic data is received as raw or on analyzed data from one or more data sources. In action 815, the label engine can receive the metadata that describes the format and content of the visual analytic data. The metadata is included in the visual analytic data, such that receiving the visual analytic data in step 810 comprises also receiving the metadata in action 815. In combination, the visual analytic data in the metadata can be used to generate a visualization of the visual analytic data in the resulting visual analytic. As used herein, the term visual analytic refers to the combination of labels and visualizations of the visual analytic data compiled into a visual analytic framework.

In action 820, the label engine may receive a set of labeling rules. In some embodiments, the labeling rules can be universal and include rules applicable to any and all types of visual analytics. In other embodiments, the labeling rules can correspond to a particular set of visual analytic data, a visualization type, a visual analytic type, a visual analytic framework, a dashboard framework, or user. In such embodiments, receiving the labeling rules may be based on the received visual analytic framework, the received visual analytic data, and/or the received metadata.

In action 825, the label engine can analyze the metadata to determine the measures and dimensional and measure values of the associated visual analytic data. In action 830, the label engine can generate a set of labels by applying the labeling rules to the determined measures, dimension values, and measure values. Generating the set of labels may include specifying specific a location within the visual analytic into which the corresponding label will be inserted. Finally, the label engine, or some other components, can render the visual analytic to include the inserted labels.

Figure 9:
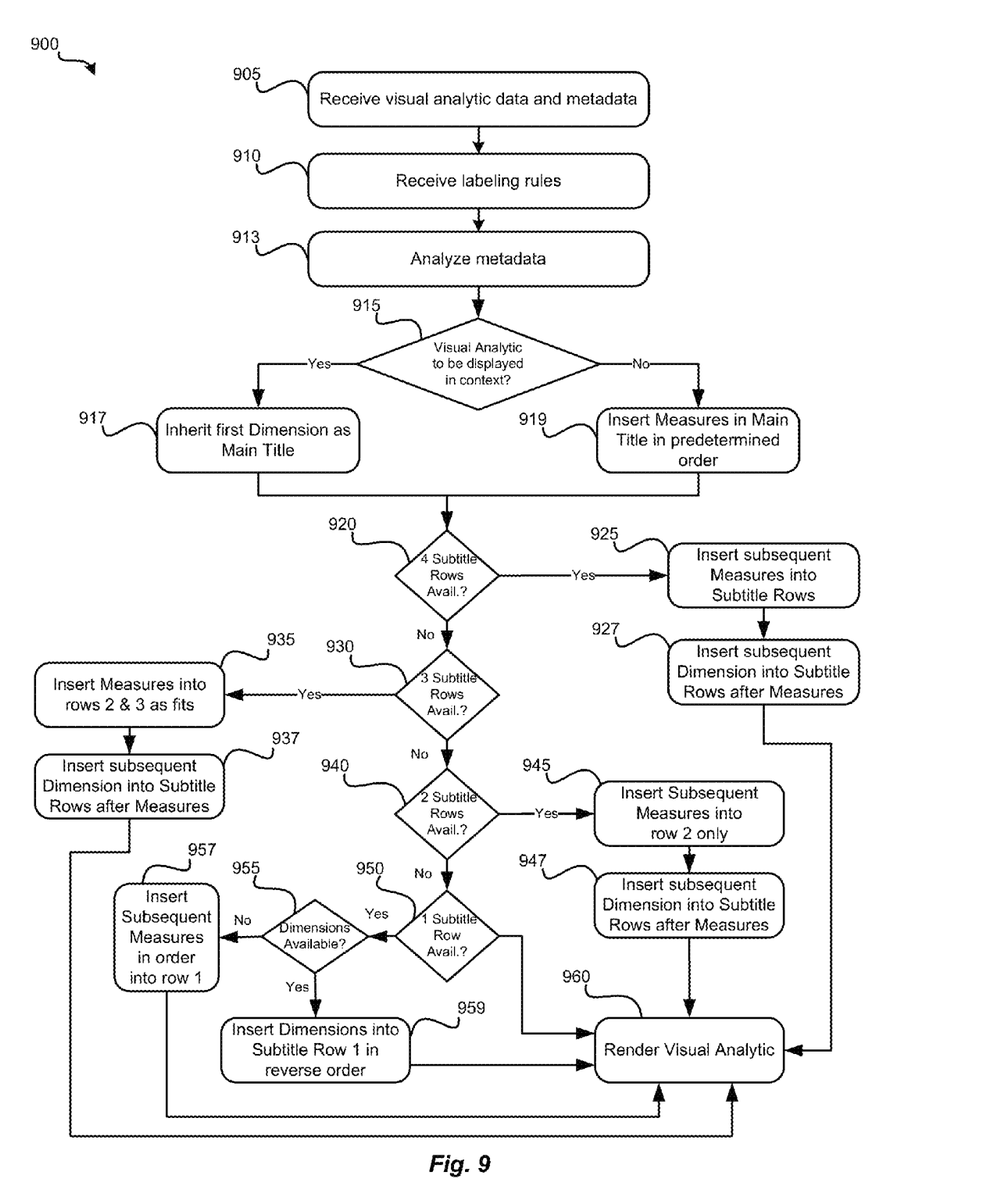
FIG. 9 is a flowchart of a method for automatically labeling small format visual analytics according to embodiments of the present disclosure.

FIG. 9 illustrates a flowchart of a method 900 for generating labels according to the rules illustrated in chart 700. Method 900 can begin at action 905 in which the label engine receives visual analytic data and metadata. The labeling engine can then receive the labeling rules in response to the received visual analytic data and or metadata, in action 910. The labeling engine can then analyze the metadata in action 913 to determine the measures, and dimensional values. In some embodiments, the label engine can also analyze the visual analytic data to determine various measure values for use in some labels for the visual analytic.

In determination 915, the label engine can determine whether or not the resulting visual analytic is to be displayed in context. For example, the label engine can determine whether not the visual analytic will be displayed on its own, independent of any other information, or if it will be displayed in a particular dashboard from which certain context can be inferred. If the label engine determines that the visual analytic will be displayed in a particular dashboard that includes limitations or contexts that imply the measures of the visual analytic, then the label engine can determine it to inherit the first dimension as the main title. If however at determination 915, the label engine determines that the visual analytic will be displayed on its own, then label engine can insert the measures into the main title and subtitles in the predetermined order. For example, the main measure may be inserted as the main title. Subsequently, the sub measures can be inserted behind them main measure in the main title or in subsequent rows of subtitles.

Method 900 also includes a determination of the number of available subtitle rows. This determination is illustrated in the flowchart as determinations 920, 930, 940, and 950. At determination hundred 20, the label engine can determine whether there are four subtitle rows available. If yes, the label engine can insert the subsequent measures into the subtitle as space permits, in action 925. If space permits, then the label engine can insert the subsequent dimensions into the subtitle rows after the measures. The order in which the dimensions are inserted into the subtitles can be determined based on the nature or characteristic of the dimensions. User specified dimensions can be inserted in reverse order of user preference or selection. Hierarchical dimensions can be inserted in hierarchical order. Once all of the available measures and dimensions are inserted into the visual analytic data or the visual analytic, the label engine or other component can then render the visual analytic in action 960.

However, if the label engine at determination 920 determines that there are not four subtitle rows available, the label engine can then determine whether there are three subtitle rows available, in determination 930. If the label engine determines that there are three rows of subtitles available, then the label engine can insert the measures into the second and third rows of subtitles as they fit. However, in some embodiments inserting the measures into the second and third rows occurs only after any available dimensional values are inserted into first and second rows of subtitles. The label engine, or some other component, can then render the visual analytics with labels, in action 960.

If the label engine determines that three subtitle rows are not available, then label engine can determine whether not there are two subtitle rows available, in determination 940. If there are two subtitle rows available, then the label engine can insert the subsequent measures into the second row only, in action 945. The subsequent dimensional values can then be inserted into the subtitle rows after the measures.

If the label engine determines that two subtitles rows are not available, then label engine can determine whether or not there is one subtitle row available, in determination 950. If there is one subtitle row available, the label engine can then determine whether not there are any dimensions determined from the metadata, in determination 955. If there are no dimensions available, then the label engine can insert the subsequent measures in order into the first row of subtitles, in action 957. However, if there are dimensions available, then the label engine may insert the dimensions into the one available subtitle row in reverse order, in action 959. In either scenario, the label engine, or some other component, can then render the visual analytics with labels, in action 960.

Figure 10:
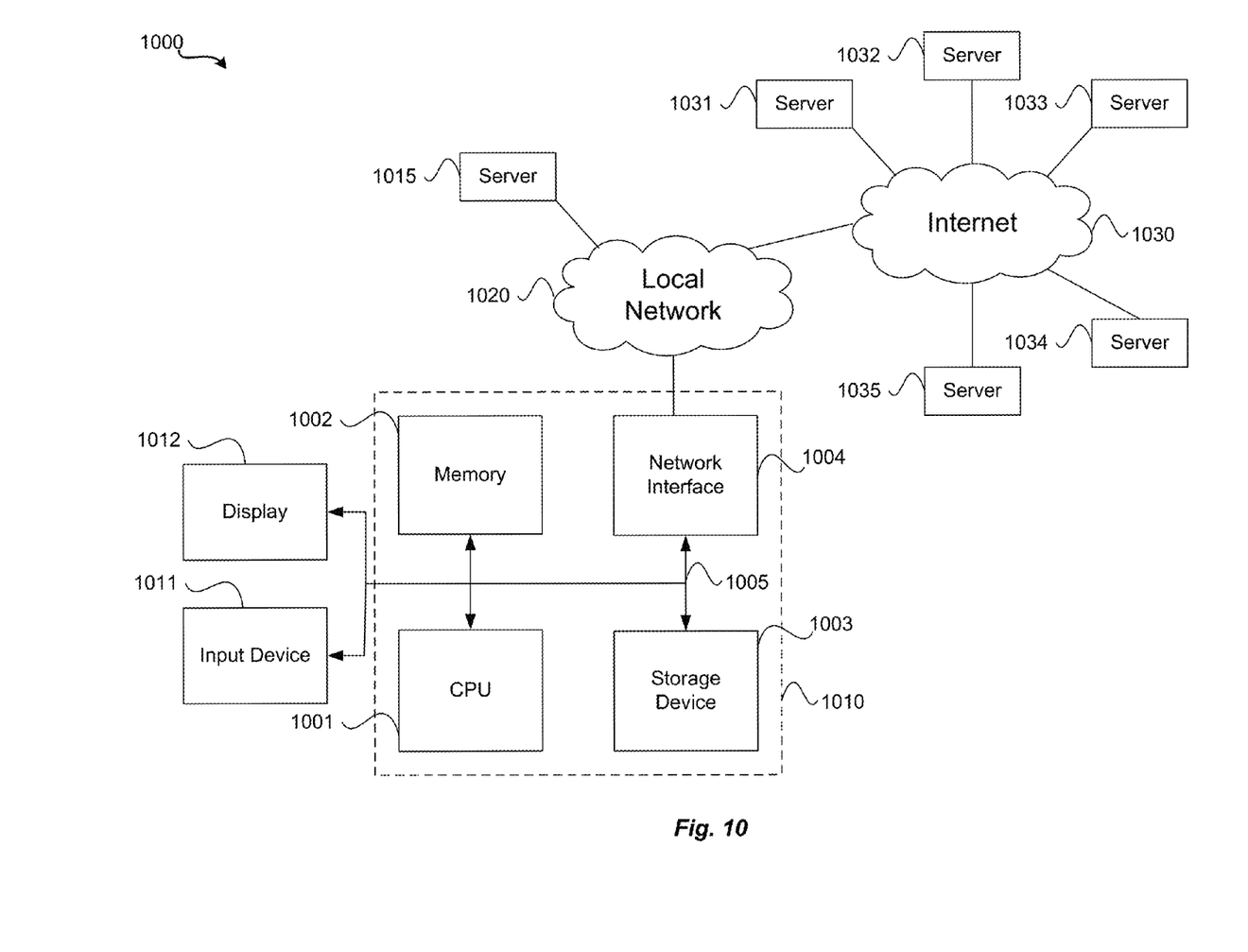
FIG. 10 is an example computer system and network that can be used to implement various embodiments of the present disclosure.

FIG. 10 illustrates an example computer system and networks that may be used to implement one embodiment of the present disclosure. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including instructions for performing the techniques described above. This memory may also be used for storing temporary variables or other intermediate information during execution of instructions to be executed by processor 1001. Possible implementations of this memory may be, but are not limited to, random access memory (RAM), read only memory (ROM), or both. A storage device 1003 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 1010 may be coupled via the same or different information bus, such as bus 1005, to a display 1012, such as a cathode ray tube (CRT), touchscreen, or liquid crystal display (LCD), for displaying information. An input device 1011 such as a keyboard and/or mouse is coupled to a bus for communicating information and command selections from the user to processor 1001. The combination of these components allows the user to communicate with the system.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1004 sends and receives electrical, electromagnetic, or optical signals that carry digital data streams representing various types of information.

Computer system 1010 can send and receive information, including messages or other interface actions, through the network interface 1004 to an Intranet or the Internet 1030. In the Internet example, software components or services may reside on multiple different computer systems 1010 or servers 1031 across the network. Software components described above may be implemented on one or more servers. A server 1031 may transmit messages from one component, through Internet 1030, local network 1020, and network interface 1004 to a component or container on computer system 1010, for example. Software components of a composite application may be implemented on the same system as other components, or on a different machine than other software components. This process of sending and receiving information between software components or one or more containers may be applied to communication between computer system 1010 and any of the servers 1031 to 1035 in either direction. It may also be applied to communication between any two servers 1031 to 1035.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    receiving, in a visual analytic handler of a label engine in communication with a visual analytic database, a visual analytic framework comprising a plurality of space constrained regions;
    receiving, in the visual analytic handler from the visual analytic database, analytic data and metadata, wherein the metadata comprises a plurality of descriptions of the analytic data including a sub title, a measure value, and a chart comparing three values; receiving, in a label rule handler of the label engine in communication with a rule database, a plurality of labeling rules referencing the sub title, the measure value, and the chart;
    transforming, in the label rule handler, the plurality of labeling rules into a plurality of transformed labeling rules, according to the visual analytic framework;
    analyzing, in the label engine, the metadata and the plurality of space constrained regions according to the plurality of transformed labeling rules to generate a set of labels, wherein a first transformed labeling rule determines display of the sub title with a dimension value followed by parent dimension values in parenthesis, a second transformed labeling rule determines that the three values be shown as a contribution of dimension values, and wherein a third transformed labeling rule determines whether a label of the chart is an actual value or in the alternative is a percentage value; and
    generating a visual analytic based on the analytic data, the plurality of constrained regions, and the set of labels.

2. The method of claim 1 wherein generating the visual analytic comprises:
    rendering a visualization based on the analytic data in a first space constrained region in the plurality of space constrained regions; and
    rendering at least a portion of the set of labels in a second space constrained region in the plurality of space constrained regions in accordance with the plurality of labeling rules.

3. The method of claim 1 wherein the first variable space constrained region comprises a number of label lines proportional to the size of the first variable space constrained region, and wherein generating the visual analytic is further based on the number of label lines.

4. The method of claim 1 further comprising receiving, in the computer system, a dashboard framework comprising the visual analytic framework, wherein the dashboard framework comprises context data, and wherein analyzing the metadata comprises comparing the plurality of descriptions of the analytic data to the context data.

5. The method of claim 4 wherein the context data comprises constraints on the analytic data.

6. The method of claim 1 wherein the plurality of descriptions of the analytic data comprises a description of a measure of the analytic data and a description of a dimension of the analytic data, wherein the measure describes a plurality of values of the analytic data, and wherein the dimension describes a category of the plurality of values.

7. A non-transitory computer readable medium comprising instructions that when executed by a label engine cause:
    a visual analytic handler to receive from a visual analytic database a visual analytic framework comprising a plurality of space constrained regions;
    the visual analytic handler to receive from the visual analytic database analytic data and metadata, wherein the metadata comprises a plurality of descriptions of the analytic data including a sub title, a measure value, and a chart comparing three values;
    a label rule handler to receive from a rule database, a plurality of labeling rules referencing the sub title, the measure value, and the chart;
    the label rule handler to transform the plurality of labeling rules into a plurality of transformed labeling rules, according the visual analytic framework;
    the label engine analyze the metadata and the plurality of space constrained regions according to the plurality of transformed labeling rules to generate a set of labels; and
    generate a visual analytic based on the analytic data, the plurality of constrained regions, and the set of labels, wherein a first transformed labeling rule determines display of the subtitle with a dimension value followed by parent dimension values in parenthesis, a second transformed labeling rule determines that the three values be shown as a contribution of dimension values, and wherein a third transformed labeling rule determines whether a label of the chart is an actual value or in the alternative is a percentage value.

8. The non-transitory computer readable medium of claim 7 wherein the instructions that cause the processor to generate the visual analytic comprises instructions that cause the processor to be further configured to:
   render a visualization based on the analytic data in a first space constrained region in the plurality of space constrained regions; and
   render a least a portion of the set of labels in a second space constrained region in the plurality of space constrained regions in accordance with the plurality of labeling rules.

9. The non-transitory computer readable medium of claim 7 wherein the first variable space constrained region comprises a number of label lines proportional to the size of the first variable space constrained region, and wherein to generate the visual analytic is further based on the number of label lines.

10. The non-transitory computer readable medium of claim 7 wherein the instructions that cause the processor to be configured to receive a dashboard framework comprising the visual analytic framework, wherein the dashboard framework comprises context data, and wherein the instructions that cause the processor to be configured to analyze the metadata further cause the processor to be configured to compare the plurality of descriptions of the analytic data to the context data.

11. The non-transitory computer readable medium of claim 10 wherein the context data comprises constraints on the analytic data.

12. The non-transitory computer readable medium of claim 7 wherein the plurality of descriptions of the analytic data comprises a description of a measure of the analytic data and a description of a dimension of the analytic data, wherein the measure describes a plurality of values of the analytic data, and wherein the dimension describes a category of the plurality of values.

13. A system comprising:
   a label engine; and
   a memory coupled to the label engine and comprising executable code that when executed by the label engine causes:
   a visual analytic handler to receive from a visual analytic database, a visual analytic framework comprising a plurality of space constrained regions;
   the visual analytic handler to receive from the visual analytic database, analytic data and metadata, wherein the metadata comprises a plurality of descriptions of the analytic data including a sub title, a measure value, and a chart comparing three values: a label rule handler to receive from a rule database, a plurality of labeling rules referencing the sub title, the measure value, and the chart;
   the label rule handler to transform the plurality of labeling rules into a plurality of transformed labeling rules, according to the visual analytic framework;
   the rule engine analyzing the metadata and the plurality of space constrained regions according to the plurality of transformed labeling rules to generate a set of labels, wherein a first transformed labeling rule determines a display of the sub title with a dimension value followed by parent dimension values in parenthesis, a second transformed labeling rule determines that the three values be shown as a contribution of dimension values, and wherein a third transformed labeling rule determines whether a label of the chart is an actual value or in the alternative is a percentage value; and
   generating a visual analytic based on the analytic data.

14. The system of claim 13 wherein generating the visual analytic comprises:
   rendering a visualization based on the analytic data in a first space constrained region in the plurality of space constrained regions; and
   rendering a least a portion of the set of labels in a second space constrained region in the plurality of space constrained regions in accordance with the plurality of labeling rules.

15. The system of claim 13 wherein the first variable space constrained region comprises a number of label lines proportional to the size of the first variable space constrained region, and wherein generating the visual analytic is further based on the number of label lines.

16. The system of claim 13 wherein the computer executable code further causes the processor to be configured for receiving, in the computer system, a dashboard framework comprising the visual analytic framework, wherein the dashboard framework comprises context data, and wherein analyzing the metadata comprises comparing the plurality of descriptions of the analytic data to the context data.

17. The system of claim 16 wherein the context data comprises constraints on the analytic data.

* * * * *